(No Model.) 3 Sheets—Sheet 1.
G. HEIDMANN, E. HÖTTGES & C. EGEN.
MACHINE FOR MANUFACTURING BUTTONS.
No. 369,787. Patented Sept. 13, 1887.
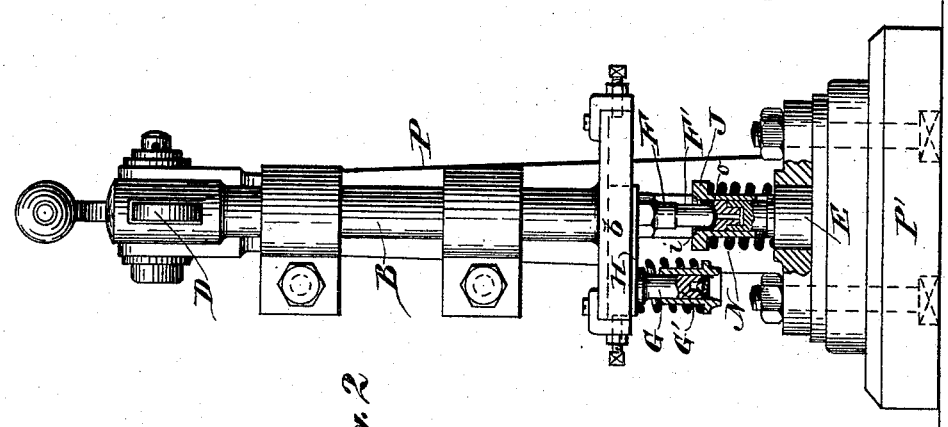
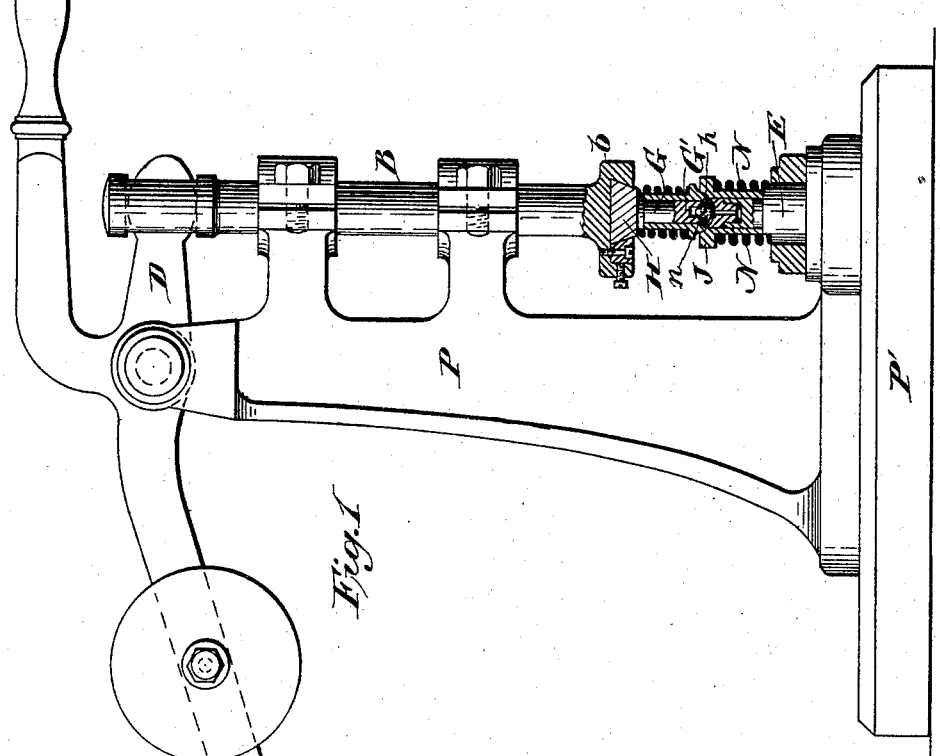
Attest:
W. E. Boulter
E. M. Gallaher
Inventors:—
Gottlieb Heidmann,
Emil Höttges,
Carl Egen,
per Henry Orth
their atty

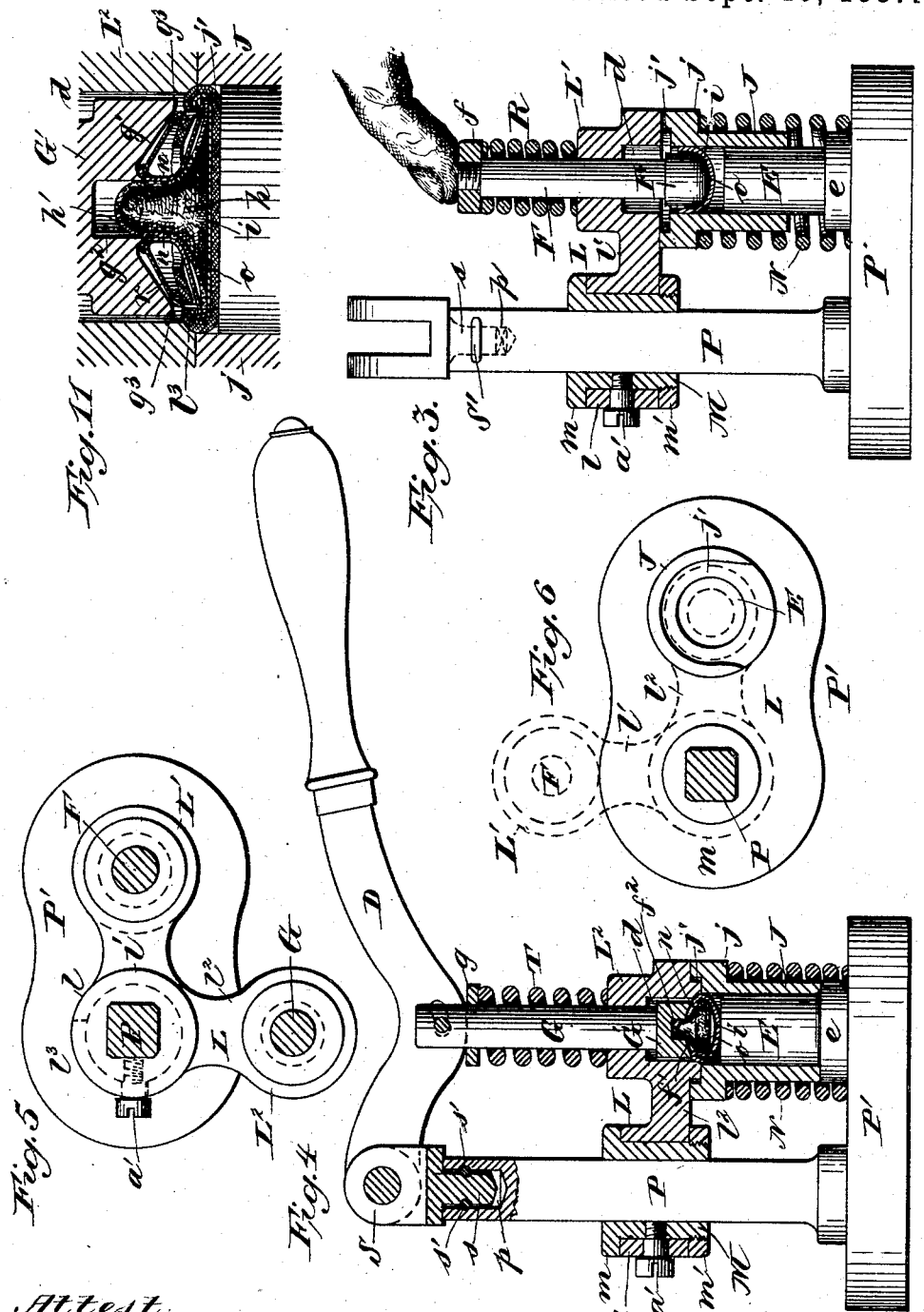

(No Model.) 3 Sheets—Sheet 3.
G. HEIDMANN, E. HÖTTGES & C. EGEN.
MACHINE FOR MANUFACTURING BUTTONS.
No. 369,787. Patented Sept. 13, 1887.
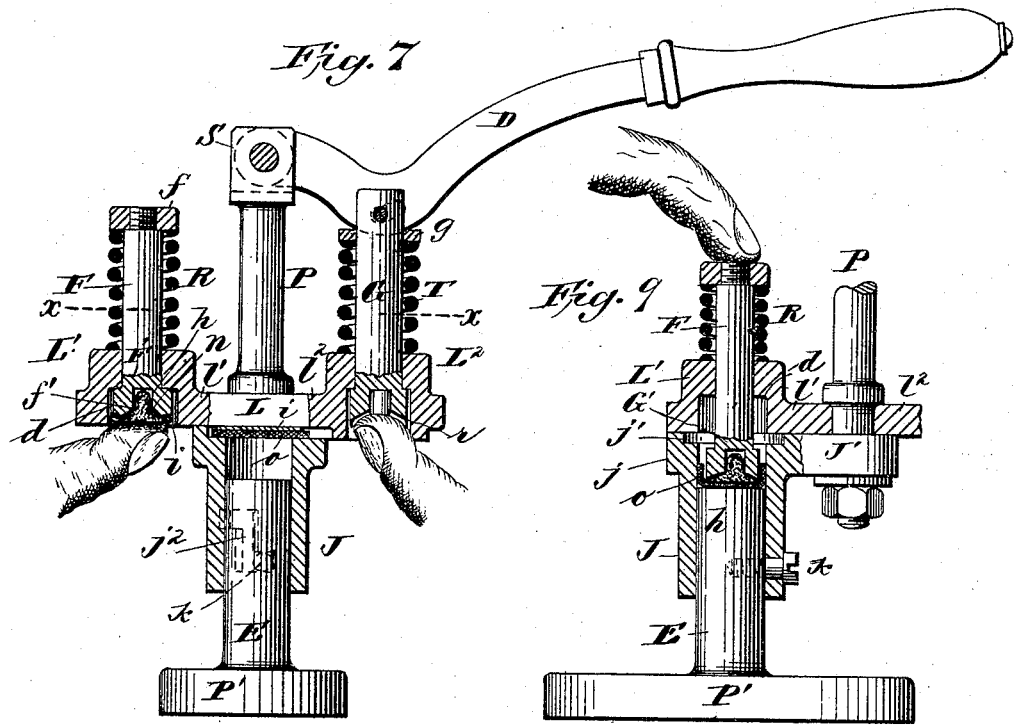
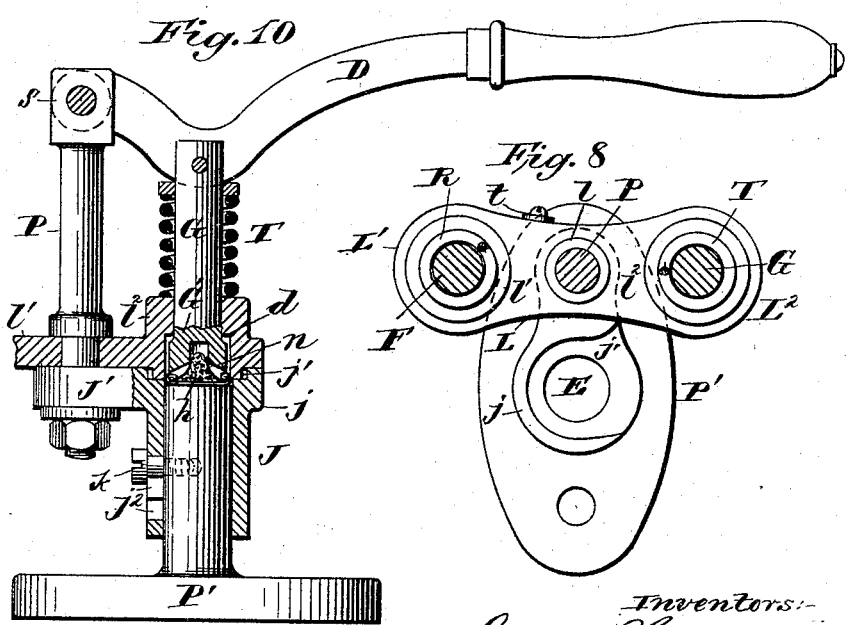

United States Patent Office.

GOTTLIEB HEIDMANN, EMIL HÖTTGES, AND CARL EGEN, OF BARMEN, PRUSSIA, GERMANY, ASSIGNORS TO HEIDMANN & HÖTTGES, OF SAME PLACE.

MACHINE FOR MANUFACTURING BUTTONS.

SPECIFICATION forming part of Letters Patent No. 369,787, dated September 13, 1887.

Application filed April 30, 1887. Serial No. 236,673. (No model.) Patented in England April 15, 1887, No. 5,491; in Belgium April 18, 1887, No. 77,106, and in Luxemburg April 19, 1887, No. 835.

*To all whom it may concern:*

Be it known that we, GOTTLIEB HEIDMANN, merchant, a subject of the King of Prussia, residing at Barmen, 93 Alleestrasse, Prussia, EMIL HÖTTGES, merchant, a subject of the King of Prussia, residing at Barmen, 31 Haspelerstrasse, Prussia, and CARL EGEN, mechanist, a subject of the King of Prussia, residing at Barmen, 10 Oberdörnerstrasse, Prussia, German Empire, have invented certain new and useful Improvements in Machines for Manufacturing Buttons, (for which Letters Patent have been granted in Great Britain, No. 5,491, dated April 15, 1887; Belgium, No. 77,106, dated April 18, 1887, and Luxemburg, No. 835, dated April 19, 1887;) and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Referring to the drawings, Figure 1 is a side elevation, partly in section, of a machine for manufacturing buttons as heretofore constructed. Fig. 2 is a front end view of the same. Figs. 3 and 4 are side elevations, partly in section, of a machine for manufacturing buttons constructed according to our invention. Figs. 5 and 6 are top plan views, partly in section, of Figs. 3 and 4, the upper-die stocks F and G and their carrier being removed in Fig. 6 and shown in dotted lines. Fig. 7 is an elevation, partly in section, of a modified construction of our machine. Fig. 8 is a section on line *x x* of Fig. 7. Figs. 9 and 10 are like views, some of the parts being removed and broken away, illustrating the several operations in the completion of a button; and Fig. 11 is a detail sectional view showing the last operation by which the button is completed.

The invention relates to machines for making that class of buttons known to the trade as "covered" or "cloth-covered" buttons, and has for its object a construction by which these machines are rendered more effective, are easier handled, and do more rapid work than is the case in machines of usual construction.

The invention consists in certain structural features and combinations of parts, substantially as hereinafter fully described, and as set forth in the claims.

In order that our invention may be better comprehended, we have shown in Figs. 1 and 2 a machine of the class referred to of the most approved construction, which, we believe, is now used almost exclusively for making this style of buttons referred to. In this machine the upper movable dies, F' and G', that co-operate with a lower sectional die, J E, are secured to a slide-block, H, that is movable laterally in a guide-groove in the under side of a cross-head, *b*, formed on a vertically-movable stock, B, said stock being connected at its upper end to a weighted lever, D, that is fulcrumed in the upper end of a standard, P, rising from a supporting or base plate, P', to which the stationary section of the lower die is secured.

In making a button a disk of fabric, *o*, is laid in the upper enlarged portion of the tubular die-section J, that slides on the stationary die-section E. On the said fabric is laid a metallic disk, *i*, of less diameter than the disk of cloth or other fabric, and the die-carrier H is moved into position on the cross-head to bring the punch F' centrally over the die-sections E J. The lever is now manipulated to depress the punch and force the fabric and metallic disk down into the contracted portion of the bore of the die-section J, thereby giving to the metallic disk or button-head a more or less concavo-convex form and bending its edge upward, as shown in Fig. 2. The lever D, when released, returns to its normal position through the medium of the weight, leaving the fabric and metallic disk in the bore of the die-section J. The pad *h*, that constitutes the filling for the button and the cloth shank, together with the back-plate *n* of the button, are next inserted into the die G', and the latter is moved into position over the die-section J, when the lever is again depressed to force said die G' into section J. On the die G is loosely mounted a spring-actuated sleeve provided with a flange of greater diameter than the upper enlarged portion of the bore of the die-section J, and has its lower edge beveled, so that in descending the die-section J will be forced down against the stress of its spring N, the beveled edge of the upper-die sleeve folding the fabric o over the bent edge of the button-head i, and by its further downward motion bends said edge over the back-plate n, as shown in Fig. 1.

The adjusting of the upper-die carrier is somewhat tedious, and great care must be had that the motion of the carrier in the cross-head b is properly limited by means of the abutment-screws to bring the dies F' G' in proper operative position. On the other hand there is but a slight pressure required in the first operation, and very often a button is spoiled by too great a pressure on the lever. Furthermore, in making a button the die-carrier has to be manipulated twice to bring the dies F' and G' alternately into position relatively to the die J, while the insertion of the back-plate and pad of the button into the die G' is also difficult.

The machine which we will now describe is designed to obviate these inconveniences and facilitate and expedite the making of the buttons.

Referring to Figs. 3, 4, 5, and 6, P' is the base-plate, from which rises a standard, P, that is preferably square in cross-section, and that has in its upper end a socket, p, in which is stepped and revolves the spindle or pin s of a forked bearing, S, as shown in Fig. 4, in which bearing the lever D is fulcrumed so as to permit the lever to revolve on the standard and with the die-carrier, presently to be described. To prevent the bearing S from lifting out of the socket in the standard when pressure is applied to the lever D, its pin or spindle s has a peripheral groove, and the standard has holes registering with said grooves, so that the legs s' of a staple, S', may be inserted to hold the pin or spindle against vertical motion without interfering with its rotary motion in the socket of the standard, as shown in Figs. 1 and 2. When it is desired to remove the forked bearing, the staple S' is withdrawn. From the base-plate P' projects the stationary portion or section E of the lower die, whose lower end is of increased diameter to form an annular shoulder, e, that serves to limit the downward movement of the movable tubular portion J of said lower die, which tubular portion is fitted and slides freely on the stationary portion E. The section or portion J of the lower die has an enlarged head, j, and its bore at the upper end is enlarged to form a recess, j', into which the disks of fabric o and of metal i are laid.

N is a spring encircling the tubular section J, and serves to return the latter into its normal position when moved out of it, the upper end of said spring abutting against the under side of the head j of the section J, and the lower end of the spring resting upon the base-plate P', as shown.

On the standard P is loosely mounted a cylindrical sleeve, M, whose bore is square in section to fit the standard, and has at its upper end a flange, m. On this sleeve is loosely mounted the die-carrier L, that consists of a bearing-sleeve, l, mounted and revoluble on the sleeve M of the standard P, and held in position by a nut, m'. The bearing-sleeve l has a slot, 13, (shown in dotted lines in Fig. 5,) traversed by a set-screw, a', screwed in sleeve M, said slot and screw serving to limit the amplitude of the rotation of the die-carrier. From the sleeve l project arms l' l² at right angles to each other, on the outer end of which arms are formed heads or bearings L' L², respectively, for the reception of the upper-die stocks F and G. The die-stock F has a punch or head, F', by means of which the metallic disk i, that constitutes the button-head, is shaped, if the button is not a flat-faced button, and by means of which the peripheral edge of said metallic disk is bent up.

The die-stock G carries a die, G', that has the usual axial recess, into which the cloth-shank of the button projects, the under face of said die being concave and having a peripheral knife-edge, by means of which edge the fabric o and metallic disk are bent over the back-plate n of the button, as usual.

The die-stock F carries at its upper end a nut, f, and the die-stock G a disk or collar, g, that serve as abutments for the springs R and T to return the die-stocks into their normal positions when moved out of it. The lower portion of the bore of the heads or bearings L' L² is enlarged to form a recess, d, into which the upper dies are withdrawn, so that the cloth and metallic disks may be easily laid into the recess j' of section J, and so that the pad h and back-plate n of the button may be readily inserted in the die G' with the finger before bringing said die G' into position for uniting said parts to the button-head and fabric.

As there is but a comparatively small power required to upset the edge of the button-head disk i, the die-stock F need, therefore, not be operated by means of a power-lever, the pressure of the hand being sufficient to depress the die and impart the necessary shape to the said disk. A greater power is, however, required to bend the upset edge of the button-head over onto the fabric and back-plate of the button, and in order to obtain this power we connect the die-stock G with the lever D, above referred to.

It is obvious that by means of the construction described the die-stock carrier may be revolved around the standard P to bring the dies F' and G' alternately into position to perform their respective functions, which are well understood, said carrier being capable of vertical movement on the standard P to follow the downward movement of the section J of the lower die in completing the button.

The machine may be modified in its construction in so far as the revoluble die-stock carrier is concerned, in that the heads L' L², instead of being arranged at right angles to each other, may be arranged in the same horizontal plane, as shown in Figs. 7 to 10, a half-turn being necessary to bring the dies F' and G' alternately into their operative positions, a stop, t, Fig. 8, projecting from the revoluble die-stock carrier, acting to limit the amplitude of the rotation of said carrier on the standard P.

The standard P, instead of being secured to or forming an integral part of the base-plate P', is secured to an arm, J', projecting from the lower-die section J, Figs. 8, 9, and 10, so that the die-stock carrier L and the die section J will both revolve and move together vertically on the stationary section E of the lower die, while said carrier has an independent rotary motion on the standard P. To this end the section J has a Z-shaped slot, $j^2$, which is traversed by a screw, K, screwed into the lower-die section E, the die being held in its elevated position by the screw entering the upper-horizontal branch of the slot and in its lowermost position by said screw entering into the lower horizontal branch of said slot $j^2$.

In cloth-covered buttons as usually made the fabric is liable to draw out from between the head and the back of the button, while in bending the edge of the button-head over the fabric and back-plate a more or less sharp edge is formed that is liable to cut the covering of the button very rapidly. To avoid this we construct the button substantially as shown in Fig. 11, and as fully described in our application for patent of even date with this, Serial No. 236,672. To make this button it is necessary to give the dies F' G' the proper form, as shown in Figs. 7 to 11.

The operation of our improved machine may be briefly described as follows: Referring to Figs. 3 to 6, inclusive, a disk of any desired fabric, o, is laid into the recess $j'$ of the movable section J of the lower die, and on this is laid a smaller disk of metal, i. The die-stock carrier is then rotated to bring the plunger or punch F' over the die J E, and is depressed by hand, as shown in Fig. 3, to force the fabric and metallic disk into the bore of the section J. On releasing the stock F its spring R will at once lift the same and withdraw the die F' from the bore of section J into the recess in the bearing L' of the die-carrier. The usual cloth-covered pad, h, with its back-plate n, having been inserted in the die G', with the cloth shank h' in the recess in said die, the carrier is rotated to bring said die G' over the die-section J, and is depressed by means of the lever D. As the die-stock G descends, the annular beveled projection $l^3$ will enter the recess $j'$ of the lower-die section J and force said section downward against the stress of its spring, the die-stock carrier also moving downward on the standard P until the lower end of section J rests upon the flange e on the stationary die-section E, at which time the button will lie on the upper face of the latter section. By a further downward movement of the die G' the knife-edge thereof will first lap the fabric o over the bent edge of the disk i, and then bend or lap said edge over the fabric and back-plate n to secure the parts of the button together and complete the button. When the lever D is released, the spring T will lift the die-stock G and withdraw the die G' into the recess in the under side of the bearing L². At the same time the spring N will lift the die-section J, and with it the die-stock carrier on the standard P, into their normal positions.

In making our improved button the die G', as shown in Figs. 7 to 11, has a conical recess, $g'$, terminating at the axial recess $g^2$, into which the button-shank projects in a downwardly-projecting knife-edge, $g^3$, while the die F in this construction is also provided with a conical recess, $f'$, merging into the axial recess $f^2$. (See Figs. 7, 9, 10, and 11.) The disk of fabric o is laid into the recess $j'$ of the die-section J, and on said disk is laid the smaller metallic button head or disk i. The pad h, with its back-plate n, is inserted into the recess $f'$ with the cloth shank projecting into the axial recess $f^2$ of the die F', and the said die is moved over the die-sections E J, and the die-stock is depressed to force the fabric o and button-head i down into the bore of the section J, thereby bending the fabric and edge of the button-head i, and by a further pressure said edges will be bent over the outer flaring end of the back-plate n, which will thus be locked to the button-head and prevented from returning with the die F' when the pressure in the die-stock ceases and said die returns into its normal position. A cylindro-conical cloth-retaining plate, r, having been inserted into the die G', as shown in Fig. 7, the die-carrier is rotated to bring said die into operative position, and the die and die-stock are depressed by means of the lever D, the beveled flange $l^3$ of the bearing L² entering the recess $j'$ of the lower-die section, J. A slight rotary motion is now imparted to the die-carrier and die G' by means of the lever D to rotate the section J sufficiently to bring the shank of the screw k into the plane of the vertical branch of the slot $j^2$ in said section J, when the lever is again depressed to force the section J down to the end of said vertical branch of the slot $j^2$. By rotating the section J, as above described, in a reverse direction the shank of the screw will enter the lower horizontal branch of the slot $j^2$ and lock the die-section J and the carrier L against vertical movement on the stationary section E. By a further downward pressure of the die-stock G the outer peripheral edge of the die G' will lap the fabric over the bent-up edge of button-head and force the teeth of the cylindro-conical retaining-plate r into said fabric behind the flange formed by the bent edge of the button-head *i*. At the same time the knife-edge $g^3$ operates upon the inner edge of the sleeve of the back-plate *n*, and bends the same over the conical end of the retaining-plate *r*, thus locking the parts of the button securely together, as shown in Fig. 11.

In our application above referred to we have fully shown, described, and claimed the construction of the several parts of this improved button, which we do not desire to claim herein.

Having described our invention, what we claim is—

1. In a machine for making cloth-covered buttons, the combination, substantially as described, with a stationary die, of a revoluble carrier and a plurality of die-stocks movable vertically in said carrier for successive operation with the stationary die.

2. In a machine for making cloth-covered buttons, the combination, substantially as described, with a stationary die, of a revoluble and vertically-movable carrier and a plurality of die-stocks movable vertically in said carrier for successive operation with the stationary die.

3. In a machine for making cloth-covered buttons, the combination, substantially as described, with a lower die consisting of a stationary section, E, and movable section J, of a revoluble carrier, a plurality of die-stocks vertically movable in said carrier, and a revoluble lever for imparting motion to one of the die-stocks, substantially as and for the purpose specified.

4. In a machine for making cloth-covered buttons, the combination, substantially as described, with a lower die consisting of a stationary section, E, and movable section J, of a revoluble and vertically-movable carrier, a plurality of die-stocks vertically movable in said carrier, and a revoluble and vertically-movable lever for imparting motion to one of the die-stocks, all adapted to operate substantially as and for the purpose specified.

5. In a machine for making cloth-covered buttons, the combination, substantially as described, with the stationary die E J, of a revoluble and vertically-movable carrier, L, provided with bearings L' L², the spring-actuated die-stocks F and G, fitted and moving in said bearings, and the revoluble lever D, connected with the die-stock G, said parts being constructed and operating as set forth.

6. In a machine for making cloth-covered buttons, the combination, substantially as described, with the stationary die E J, the section J whereof is revoluble and movable vertically on the section E, said section J being provided with a Z-shaped slot, *z*, and the stop *k*, of a revoluble and vertically-movable carrier, L, provided with bearings L' L², the spring-actuated die-stocks F and G, mounted in said bearings L' L², respectively, and the revoluble lever D, connected with the die-stock G, said parts being constructed and co-operating as set forth.

In testimony whereof we affix our signatures in presence of two witnesses.

GOTTLIEB HEIDMANN.
    EMIL HÖTTGES.
    CARL EGEN.

Witnesses:
 GUSTAVE ALBERT OELRIECHS,
 PETER MARX.